United States Patent Office 2,887,225
Patented May 19, 1959

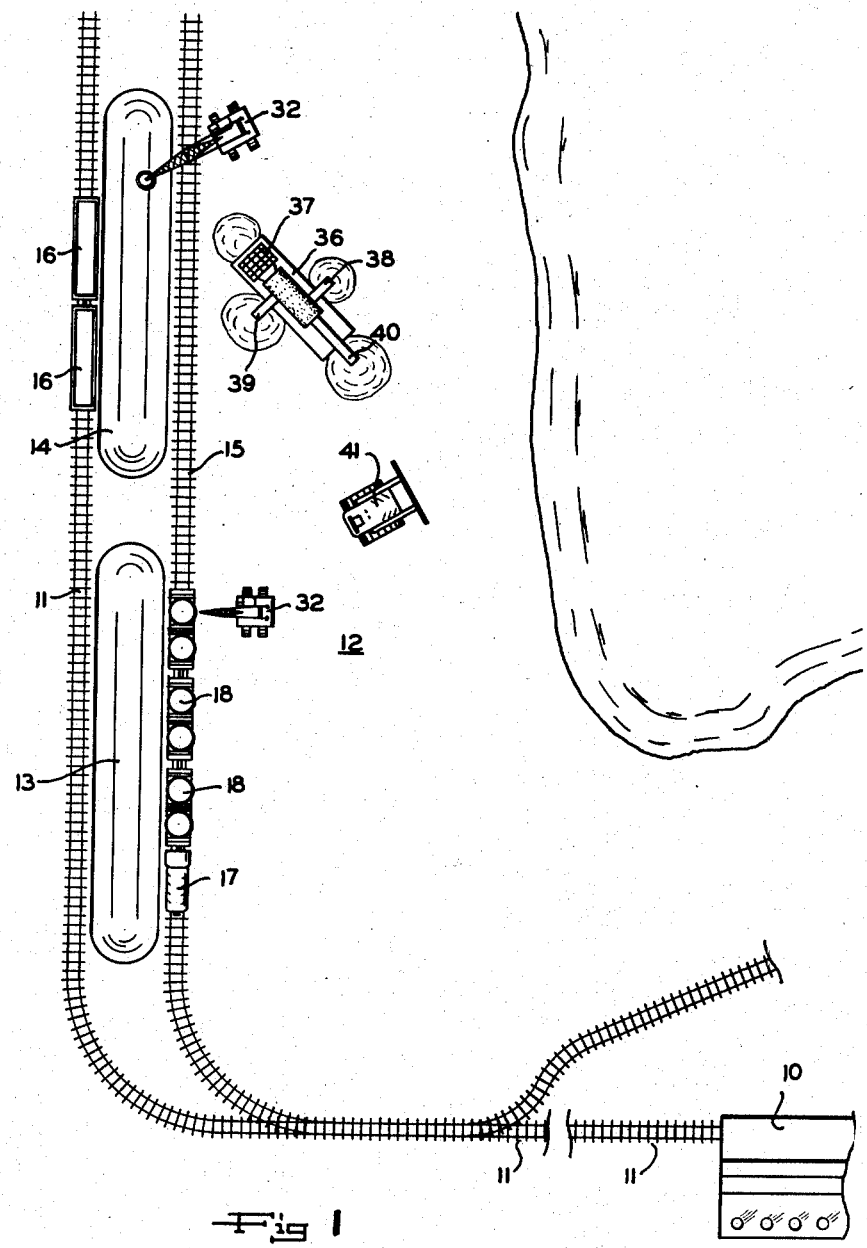

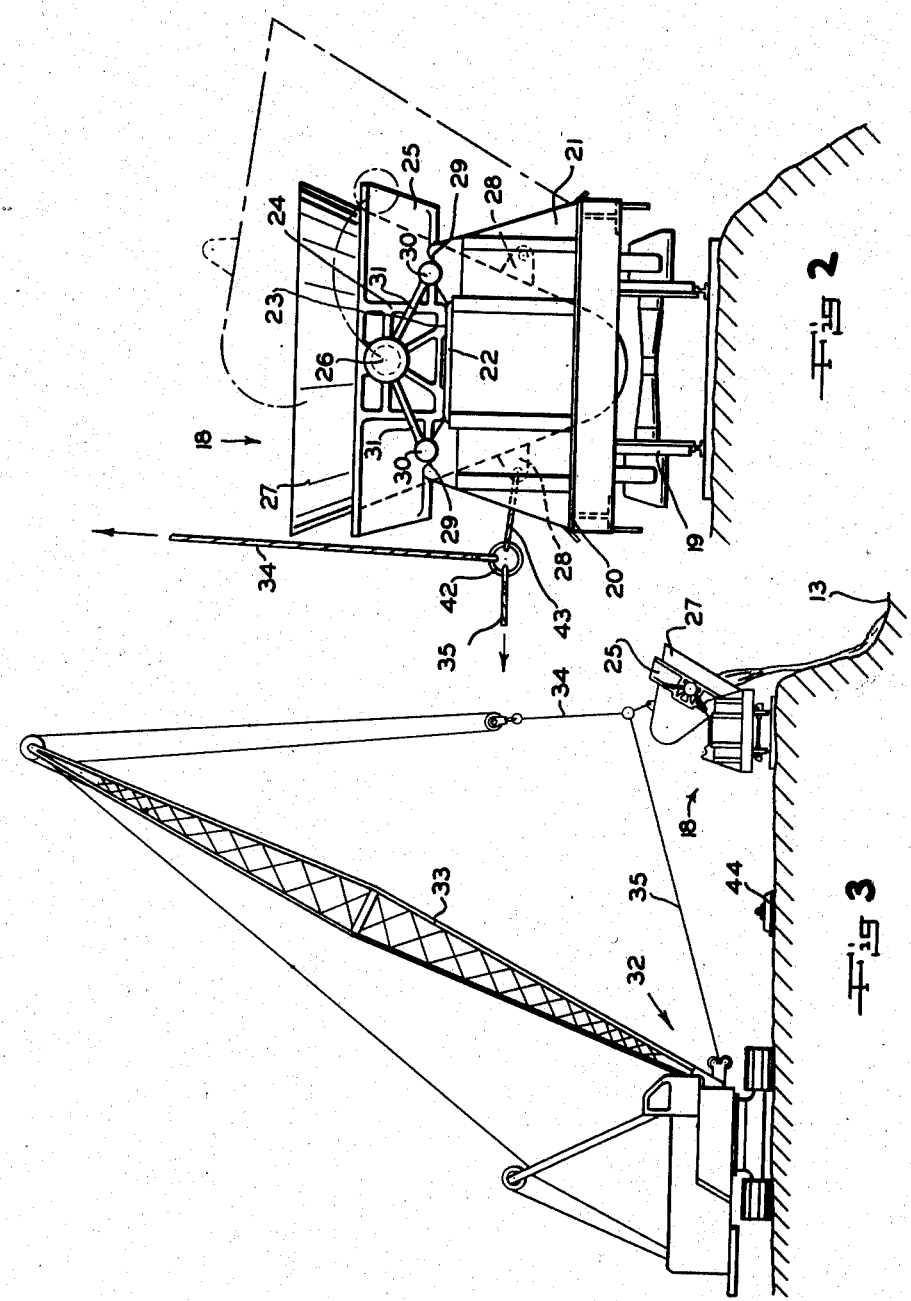

2,887,225

METHOD AND APPARATUS FOR DISPOSING OF OPEN HEARTH SLAG AND REFUSE

Eric Harlow Heckett, Valencia, Pa., assignor to Harsco Corporation, Harrisburg, Pa., a corporation of Delaware Application June 14, 1952, Serial No. 293,524

2 Claims. (Cl. 209—3)

This invention relates to the general art of operating open hearth steel plants and more particularly to the improvement in the manner of disposing of the slag and refuse normally resulting from the full scale operation of such plants. The invention is yet more particularly directed to the problem of disposing of the slag resulting from the steel making operations but since the method herein proposed for this purpose is shown herein to be capable of advantageous integration with the further problem of disposing of the general refuse of the mill the invention is considered to reside in the general teachings herein contained as well as in the more specific aspect of simply disposing of the slag.

In the normal operation of open hearth departments of steel plants substantial quantities of steel become entrapped in the slag during the steel making and pouring operations and unavoidably, in order to minimize the extent of slag inclusion in the poured ingots, a substantial weight of free steel is diverted into the slag pot at the tapping of each heat of each furnace. After a teeming period during which the heavier ferrous metal settles down and collects in the bottom of the pot and becomes at least partially solidified, the pot is dumped into a slag pit to thereby free the large chunk of metal or "skull" which is subsequently broken up either by cracking with the ball or by lancing with an oxygen torch for recharging in the steel making furnace. This recovery of steel from the slag pot is essential to the economic operation of the open hearth department and has been practiced for many years. However, the dumping of the large heavy pots of encrusted and molten slag is rather hazardous due to splashing and the danger of explosion and heretofore this has been accomplished in a pit provided for this purpose at a point considerably removed from the ingot pouring floor of the steel plant. Also, the prior practice has been to provide the slag pots with a pair of heavy supporting trunnions which are engageable by the hooks of the ladle crane over the pouring floor to remove the slag pot from the vicinity of the furnace and to dump the pots of this construction into the slag pit a principal overhead supported crane is required in addition to a secondary overhead crane which is operative to tilt the pots about the trunnions while the principal crane supports the same. Substantial overhead crane trackage is required for this arrangement regardless of whether the craneway is built separately or is a continuation of the principal craneway over the pouring floor of the mill building since the pit area to be serviced must be quite large in order that the heat of cooling slag and skulls will not unduly interfere with the recovery of skulls from prior dumpings. Because of these various requirements the plant facilities heretofore required for the recovery of the metal of the skulls has required substantial capital investment and has been quite expensive to maintain and operate. Also, the inherent nature of this operation is such that its close proximity to the steel making plant is objectionable as utilizing valuable space, adding to the dust and steam in the immediate atmosphere, and generally creating confusion.

It is accordingly the primary object of the invention to provide an economical method and improvement in plant facilities for carrying out this method which avoids the objectionable aspects of open hearth operation as outlined above. More specifically, I have provided a new arrangement of plant facilities whereby both the filled slag pots and the other and more general refuse of the open hearth plant may be expeditiously and economically removed from the plant on common standard railway trackage and brought to a common processing area which may be quite far removed from the plant and there advantageously worked by common facilities to recover not only the steel skulls from the slag pots but also the reusable scrap steel which unavoidably becomes mixed with the general refuse of the mill during normal operation of the same. By general refuse is meant sweepings, discarded broken and worn out machine and equipment parts, broken-up masonry, etc., and one of the further advantages resulting from the use of my method is that all of this debris is effectively searched to recover all the reusable scrap iron and steel contained in it while being rendered more suitable for fill material for reclaiming waste lands, making additional land, or merely making excellent land bases in areas adjoining the steel mill for future expansion of the mill or for other industrial uses.

A further and more specific object of the invention is the provision of improved and substantially simplified plant facilities for dumping slag pots normally used by open hearth steel mills for carrying the slag away from the mill. For accomplishing this object I propose that the pots remain supported, to a major extent at least, on mill type of railway cars capable of travel over standard trackage both during the transportation out of and away from the mill and during the dumping of them, as well as during the travel back into the mill for subsequent use. For this purpose I prefer to use cars with specially constructed supporting pedestals to receive and retain the pots in upright position so that at the dumping station the pots may be readily tilted by power apparatus of wide, rather than specialized, utility and in such manner that the slag is spilled free and clear of the undercarriage of the cars while the pots are yet supported in substantial part at least on the cars. In this manner the invention eliminates entirely the heretofore considered necessary extensive stationary plant facilities at the slag pit, and greatly increases the efficiency and economy of disposing of the waste slag while yet recovering the valuable scrap steel from the skulls.

The above and other objects and advantages of the invention will become apparent upon consideration of the following detailed specification and accompanying drawing wherein there is disclosed the method of my invention and the preferred apparatus for carrying out the same.

In the drawings:

Figure 1 is a schematic plan view of a plant installation which may be employed in effectively using the method of my invention;

Figure 2 is an end elevation of an assembled mill type of railway car and slag pot of preferred construction for carrying out the teachings of my invention; and Figure 3 is an elevational view of a conventional drag line crane and the assembly of Figure 2 showing how, in accordance with the teachings of my invention, such crane may be utilized to dump the slag pots while mounted on the cars.

Referring to the drawing and more particularly to Figure 1, the reference numeral 10 represents an open hearth steel mill from which the slag and general refuse may be hauled away over a railroad track 11. In an area designated generally by the reference numeral 12, which may be located quite far from the mill 10 for the advantageous purposes above outlined I provide at least two elongated pits 13 and 14 which are preferably axially aligned as shown in order that both sides of each pit may be conveniently served with railroad trackage—the track 11 running along one side of the pits while a branch line 15 thereof runs along the other side of the pits. The area 12 is preferably located in a leveled section of an existing slag and refuse dump since the porosity of this fill material is an outstanding advantage in keeping the pits 13 and 14 clear of free standing water. Violent and dangerous explosions occur if the molten open hearth slag is poured into containers or pockets containing water.

Reference numeral 16 designates refuse cars which are of the conventional dumping type having air operated means, not shown, whereby the load may be dumped to one side and into one of the pits while the trucks of the cars remain fixed on the track. A locomotive is shown at 17 and the assembled slag pots and transporting cars therefor are shown at 18.

Referring now to Figures 2 and 3 which illustrate the slag cars in detail it will be observed that the same comprise conventional wheel and axle assemblies 19 which support flat beds 20. Supported in upstanding relation on each car are at least two spaced parallel plate-like pedestals 21 which are rigidly secured to the car bed by welding or otherwise. Centrally disposed on each pedestal 21 is a flat supporting pad 22 which is adapted to receive the flat bottom surface 23 of a boss 24 cast integrally on the supporting ring 25. Thus far, this is conventional construction and it will be well understood by those familiar with the art that two such bosses 24 are provided on each ring in diametrically opposed relation and extending radially outward from each boss 24 is a heavy pintle pin or trunnion 26 by which the pot may be lifted by the lifting hooks of the ladle crane in the steel mill. Also, in accordance with usual practice, the pot proper, designated by reference numeral 27 is cone shaped and the interior surface of the ring 25 is complementarily formed to provide a firm seat for the pot 27. At diametrically opposed points toward the bottom of the pot and 90 degrees removed from the trunnions 26 are the apertured lugs 28 which are integral with or rigidly secured to the side wall of the pot 27.

To provide apparatus for carrying out the method of the present invention the pedestals 21 are elongated in directions transverse of the car and the upper edges of these elongated ends are contoured to form semi-cylindrical seats 29, one on either end of the supporting pad 22. Seats 29 are adapted to rotatably receive the rounded end enlargements 30 of the bars or struts 31 which may be either cast integrally with the bosses 24 or rigidly secured thereto by welding. It should be understood that the enlargements 30 are cylindrical in form to provide adequate support for the slag pot when the same is tilted upwardly to the position shown in Figure 3. It should also be understood that the supporting struts 31 are sufficiently recessed in the webs of the bosses 24 so as not to interfere with the crank hook when engaging the trunnions 26.

Reference numeral 32 designates generally a conventional crawler type of dragline crane having a boom 33 supporting a hoist line 34 and having a dragline 35. As will appear later the crane 32 is of extreme usefulness in my method of operations, not only in dumping the slag pots but in excavating the slag and refuse from the pits 13 and 14, and subsequently handling such material, and in separating therefrom reusable iron and steel scrap. Thus, referring again to Figure 1, there are shown two such cranes 32, one adjacent the slag cars which are shown positioned on track 15 by the side of pit 13 and the other in operating position over the pit 14. Reference numeral 36 designates generally a portable magnetic separation plant which may be of the general nature disclosed in my U.S. Patent No. 2,352,712 and thus having an inclined loading grid 37, a conveyor 38 for the discharge of magnetic fines and a conveyor 39 for the discharge of larger pieces of magnetic material or vice versa, and a conveyor 40 for the discharge of all non-magnetic materials. The waste refuse material and slag from which all the reusable metal has been reclaimed is removed and leveled for any of the purposes outlined above by conventional earth moving equipment such as a bulldozer 41.

In the normal operation of the plant facilities described above the slag pots 27, when filled, are handled by the ladle crane in the steel mill and are placed thereby on the cars 18 which are subsequently accumulated into trains for transfer to one or the other of the pits 13 or 14.

Upon the cars 18 arriving at the side of the pit one of the cranes 32 is detached from its bucket, magnet or other implement and by means of any suitable linkage such as the ring 42 and an attached hook 43 has its hoist line 34 and dragline 35 connected to one of the lugs 28 of one of the pots 27 on the side thereof opposite the pit. Upon the application of power to hoist line 34 the pot is tilted up and over to the position shown in Figure 3 whereby the slag contained in the pot and the skull, if any, is discharged into the pit 13. It should be observed that the slag pot rotates about the trunnions 30 which are off center on the car on the side adjacent to cause the flow of the slag being dumped to clear the understructure of the car and to spill onto the sloping side wall of the pit. A substantial portion of the weight of the slag and pot remains on the car, however, thereby enabling the physical size and power of the crane 32 to be kept within practicable limits. By careful manipulation of the controls of the crane which governs the tension in the dragline 35 sufficient back tension is maintained in the dragline 35 as the slag pot tilts up and over to prevent the slag pot and/or car from becoming entirely unbalanced and falling into the pit. This feature of the invention is highly important since without it it would be impossible to handle the slag cars in the mose expeditious and economical manner herein taught. The slag cars are dumped in succession after which a conventional clam shell type of bucket, not shown, may be affixed to the crane 32 which is adjacent the slag cars for the purpose of depositing a quantity of loose granulated cold slag in the bottom of each pot to prepare the same for reuse in the steel mill where the slag bottom prevents the fusion of hot molten metal settling down out of the slag at the bottom of the pot and lessens the tendency of the subsequently formed skull to stick in the bottom of the pot.

The very high temperature of the dumped slag together with the enormous quantities of heat stored therein requires a prolonged cooling period before the dumped slag can be processed or the skulls recovered therefrom and in actual practice a particular bit or a portion of a pit in which molten slag has been dumped is allowed to cool for 24 hours or more before the pit or portion thereof is worked. Suitable water sprays, not shown, are employed to speed up the cooling of the dumped slag. After the slag has cooled sufficiently the skulls are either broken up in the pit by means of such equipment as a skull cracking ball which, in accordance with usual practice, is handled by a magnet 44 which may also be attached to the crane 32 or are removed from the pit and then cut up into pieces of predetermined maximum size by lancing with oxygen or by blasting. Thus, the skulls and other large pieces of reusable metal are reduced in size sufficiently to be handled by the equipment of the open hearth furnace and this metal is then loaded on to suitable cars, not shown, for transportation back into the mill. After thus disposing of the skulls and other large pieces of metal the remaining material in this pit or portion is excavated by a drag bucket, also not shown, which may be attached to the crane 32 and the material may be deposited directly onto the loading grid 37 of the continuously operating separator 36, it being understood that the separator 36 is moved around on the site as required to minimize handling of materials. The grid 37 rejects all of the very large material pieces and these accumulate on a pile at the end of the separator 36. The magnetic fines coming from the conveyor 38, for example, is advantageous material for charging into a blast furnace since not only are the metallic values recovered but the composition of the open hearth slag content thereof is useful as the flux in the smelting process of the furnace. The larger size metallic pieces coming from the discharge conveyor 39, for example, are valuable for recharging directly back into the open hearth furnaces.

All the plant facilities outlined above are equally useful in the processing of the general refuse resulting from the normal operation of the open hearth plant and in making final disposition of the same after recovering all the reusable metal entrapped and contained therein. This general refuse material which is brought out of the steel mill in trains of the cars 16 is dumped in one or the other of the pits formed along the railroad tracks in any location sufficiently removed from the points at which slag is being dumped or at which previously dumped slag is cooling, or from which skulls are being currently taken, and such dumped refuse material may be immediately excavated by the dragline buckets on the crane and systematically searched with the portable magnets 44 which are attached to other of the cranes whereby the metal bearing pieces may be separated out of the roughage of the refuse and the waste roughage thus made available for filling land as above outlined. The more friable bulk of the refuse is similarly excavated and run through the separator 36 to likewise glean therefrom pieces of scrap iron and steel. The large pieces which are rejected by the grid 37 are periodically searched by one of the magnets 44 and the metal bearing pieces are either loaded directly into the scrap cars or are first cleaned in a tumbler barrel, for example, not shown, and the metallic pieces similarly gleaned from the roughage as mentioned above are similarly disposed of.

The above described method and apparatus for disposing of the slag and refuse resulting from the normal current operation of an open hearth steel plant is highly advantageous in its overall aspect and result since it not only completely recovers all the reusable metal contained in the slag and refuse but provides efficient and economically sound system for disposing of the waste slag and refuse while yet materially reducing the physical plant required by the mill. In addition, other collateral benefits result such as decreased air pollution about the plant, better land utilization, and greater safety for the operation of the plant.

Having thus described my invention what I claim is new and desire to secure by Letters Patent is:

1. A plant installation for disposing of the waste slag of an open hearth steel mill as accumulated from current operations thereof and for recovering the steel scrap contained in said slag and wherein the slag is transported from the steel mill in slag pots supported on railway cars and in which the steel contained in the slag may collect in the bottom of the pots to form heavy skulls; the combination of a railroad track leading outwardly from the mill on which said cars are operated, a plurality of pits spaced along one side of said tracks to receive the slag as dumped from said pots, said pots and cars being of the kind in which said pots may be tilted to one side of the track for dumping while being supported on the cars, and a portable crane having a hoist line and a dragline positioned on the opposite side of said track and operative both for tilting and dumping said pots and for excavating the dumped contents of said pits, means to attach both the hoist line and the dragline to the pots, the arrangement being such that during dumping of the pots by the hoist line the dragline prevents the said heavy skulls from overturning the pots and cars upon discharge of the skulls out of the pots.

2. A plant installation for disposing of the waste slag of an open hearth steel mill as accumulates from current operations thereof and for recovering the steel scrap contained in said slag and wherein the slag is transported from the steel mill in slag pots supported on railway cars and in which the steel contained in the slag may collect in the bottom of the pots to form heavy skulls; the combination of a railroad track leading outwardly from the mill on which said cars are operated, a plurality of pits spaced along one side of said tracks to receive the slag as dumped from said pots, said pots and cars being of the kind in which said pots may be tilted to one side of the track for dumping while being supported on the cars, means providing a hoist line and a dragline on the opposite side of said track, means to attach both the hoist line and the dragline to the pots, the arrangement being such that during dumping of the pots by the hoist line the dragline prevents the heavy skulls from overturning the pots and cars upon discharge of the skulls out of the pots while during recovery operations said hoist line and dragline may be attached to magnetic lifting means and excavating means for processing and removing said slag from said pits.

References Cited in the file of this patent

UNITED STATES PATENTS

| | | |
|---|---|---|
| 761,319 | Patterson et al. | May 31, 1904 |
| 859,238 | McDonald | July 9, 1907 |
| 2,205,154 | Randolph | June 18, 1940 |
| 2,264,204 | Heckett | Nov. 25, 1941 |
| 2,352,712 | Heckett | July 4, 1944 |
| 2,393,695 | Kling | Jan. 29, 1946 |
| 2,471,562 | Fitterer | May 31, 1949 |

FOREIGN PATENTS

| | | |
|---|---|---|
| 369,219 | Germany | Feb. 16, 1923 |

OTHER REFERENCES

Making, Shaping and Treating of Steel, published by the United States Steel Company, 1951, page 323.

National Slag Association, Symposium No. 6, July 1928, Preparation of Slag for the Market, 32 pages, pp. 3 to 6 relied on.